No. 895,341.  
PATENTED AUG. 4, 1908.

J. W. CLOUD.  
GRADUATING RELEASE VALVE.  
APPLICATION FILED MAR. 9, 1904.

Witnesses:  
Walter Samariss  
Chas. H. Ebert

Inventor,  
John W. Cloud  
By. Paul Synnestvedt  
Attorney.

No. 895,341. PATENTED AUG. 4, 1908.
J. W. CLOUD.
GRADUATING RELEASE VALVE.
APPLICATION FILED MAR. 9, 1904.

Witnesses:

Inventor,
John W. Cloud
By Paul Synnestvedt
Attorney.

UNITED STATES PATENT OFFICE.

JOHN WELLS CLOUD, OF LONDON, ENGLAND, ASSIGNOR TO WESTINGHOUSE AIR BRAKE COMPANY, OF WILMERDING, PENNSYLVANIA, A CORPORATION OF PENNSYLVANIA.

GRADUATING RELEASE-VALVE.

No. 895,341.  Specification of Letters Patent.  Patented Aug. 4, 1908.

Application filed March 9, 1904. Serial No. 197,355.

*To all whom it may concern:*

Be it known that I, JOHN WELLS CLOUD, a citizen of the United States, residing at London, England, have invented certain new and useful Improvements in Graduating Release-Valves, of which the following is a specification.

This invention has reference to improvements in what are known as graduated release valves, and has for its object, primarily, the provision of a device of this character which will be efficient and reliable in its operation, and which will not interfere in any wise with the usual functions of the brake nor be liable to cause trouble in practical use.

In carrying out my invention I have illustrated the same in preferred form in Figures 1 and 2, and in slightly modified form in Figures 3 and 4 of the accompanying drawings, in which—

Figure 1:
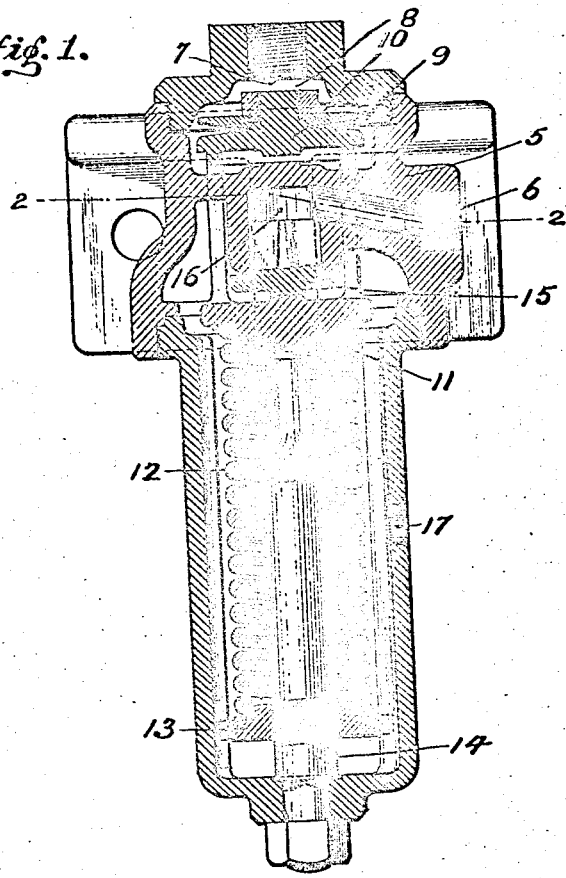
Figure 1 is a vertical sectional view through a valve device embodying my improvement.
Figure 2:
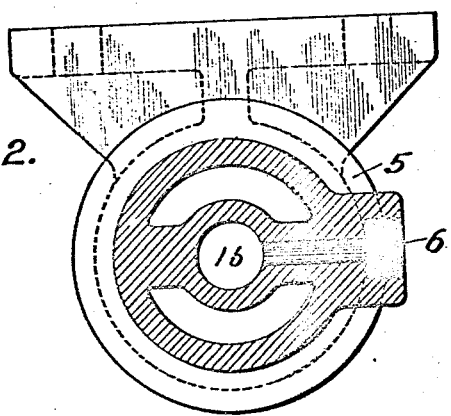
Figure 2 is a transverse section taken on the line (2) of Figure 1.

Referring now more particularly to Figure 1 it will be seen that I have therein shown a valve casing 5 containing a threaded opening 6 at the side which, in this instance, is intended for connection to a brake cylinder exhaust port, and another threaded opening 7 at the upper end which is intended for connection to the train pipe. The air entering from the opening 7 fills the chamber 8 which is closed below by means of the diaphragm 9 preferably of spring metal held in place as shown. The under part 10 of the backing of the diaphragm is extended by a yoke to an abutting portion 11 which bears against the spring 12 subject to adjustable compression by means of the collar 13 having threaded engagement with the stem 14. Upon the upper side of the part 11 rests a valve 15 which closes an opening to a chamber 16 that has communication with the pipe connection attached at 6. The area of the valve 15 and of the diaphragm 9 have such a proportion to each other as will insure the desired graduated release effect of the several parts. The chamber containing the spring 12 is open to the atmosphere through the port 17 and also communicates by the passages through which the yoke extends with the chamber on the under side of the diaphragm 9, so that the diaphragm 9 is exposed on its upper side to train pipe pressure and on its under side to the pressure of the atmosphere only. The strength of the spring is resisted by both the pressure on the diaphragm 9 and the pressure on the valve 15, whenever there is pressure in the chamber 16.

The operation of my invention is as follows:

Assuming the brakes to be applied with pressure in the train pipe 7 reduced as occurs in the application of an automatic brake, and fluid pressure acting in the brake cylinder, as will be understood by those skilled in the art, if it now be desired to make a partial release of the brakes the train pipe pressure is slightly raised, this will press down on the diaphragm 9 with increasing force and being augmented by the pressure on the upper face of the valve 15 that is the air in the chamber 16 will overcome the resistance of the spring 12 and cause an opening of the valve 15 and allow a certain amount of the air in the chamber 16 and the connected brake cylinder to escape to the atmosphere through the ports 17 until the reduction of pressure upon the upper face of the valve 15 has reduced the force acting against the spring 12 to a point that will permit the spring 12 to seat the valve 15 which will cut off further escape and hold the brakes applied with the remaining pressure in the cylinder. If a further exhaust of cylinder pressure is required another increase of train pipe pressure is made when the operation just above described is repeated. When the brakes are fully released the valve 15 will be away from its seat, and the exhaust port from the cylinder open because the train pipe pressure that accumulates in full release above the diaphragm 9 will be sufficient of itself to hold the valve 15 open against the strength of the spring 12.

Figure 3:
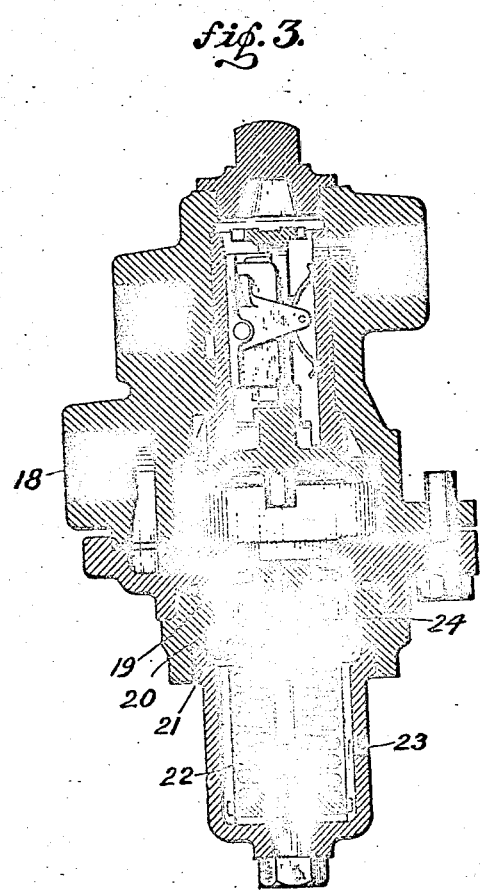
Figure 3 is a vertical section showing the ordinary construction of plain triple valve with my improvement applied in a modified form to the lower part of the casing of the triple valve in the cap thereof.

Referring to the device shown in Figure 3, it will be seen that I have therein applied an improved or modified form of my invention to a triple valve directly, the train pipe pressure entering at 18 and acting upon the upper side of the diaphragm 19 which is acted upon on its under side by pressure in a chamber 20, which in turn acts upon another diaphragm 21 in a downward direction against the force of the spring 22 that is housed in a cavity open to the atmosphere through the port 23. The pressure in the chamber 20 comes from the cylinder exhaust, and of course when the brake is released there is no air in such chamber, which makes it necessary to so adjust the strength of the spring 22, that when the brakes are released and there is no pressure in the chamber 20, the pressure above the diaphragm 19 will be sufficient to hold the valve 24 open, as it is shown in the drawing.

If now the brake be applied the valve 24 will be closed because the reduction in train pipe pressure necessary to apply the brakes will cause a preponderance of the strength of the spring such as will move the valve seat up against the valve 24. If a graduated release of the brakes is desired a small increase in train pipe pressure is made, which will have the effect of unseating the valve 24 to permit reduction of pressure in the chamber 20 until the pressure therein has so far reduced as to cause the spring to overcome the effect and close the valve again, after which further graduated release can be secured by another increase in train pipe pressure.

Figure 4:
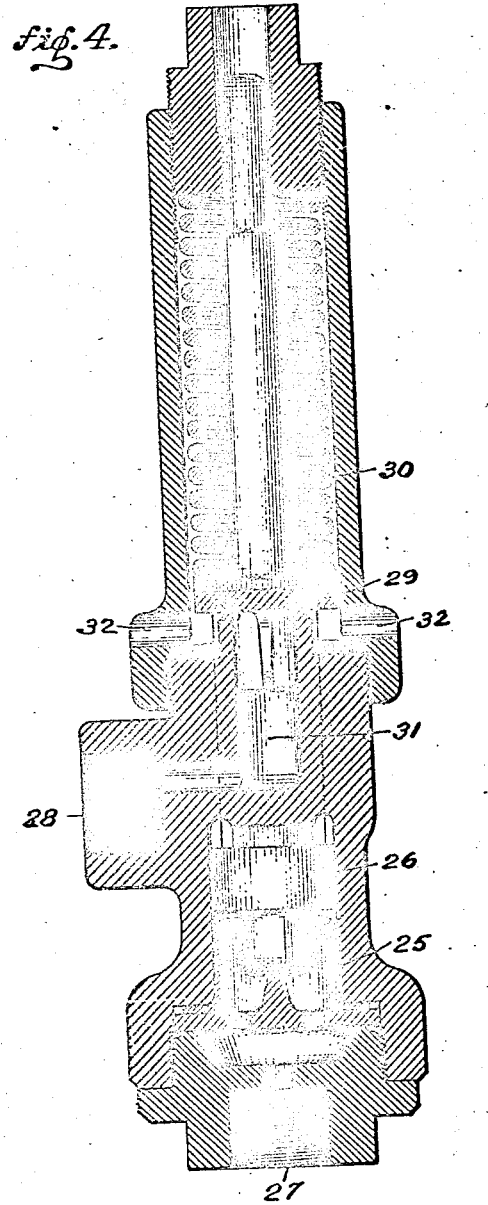
Figure 4 is a modified form of the graduated release valve device itself in which certain alterations in detail of construction have been made.

Referring now to Figure 4 it will be seen that I have therein shown still another modified form of the graduating release valve of my invention, in which the metal disk constituting the diaphragm employed in the other devices has been replaced by a flexible rubber disk 25 acting against the plunger 26. In this arrangement the train pipe is connected at 27 and the cylinder exhaust at 28. the pressure of the cylinder being effective against the valve 29 against the resistance of a spring 30, so that when the combined pressure in the cylinder and chamber 31 and the pressure in the train pipe acting on the diaphragm 25 is sufficient to overcome the strength of the spring, the valve 29 will lift and cause an escape of pressure from the cylinder through the exhaust port 32 until the pressure has sufficiently reduced to allow the spring to seat the valve 29 again which will cut off further escape, until another increase is made in train pipe pressure.

Having thus described my invention and illustrated its use, what I claim as new and desire to secure by Letters Patent, is the following:

1. A graduated release device for fluid pressure brakes comprising in combination a cylinder release valve, and a movable abutment, both exposed to pressure tending to open the valve when the brake is applied the one to train pipe pressure and the other to pressure from a cylinder, and a spring opposed to the two pressures and tending to seat the release valve, substantially as described.

2. A graduated release valve device for fluid pressure brakes comprising in combination a release valve exposed to exhaust pressure tending to open it, a spring acting to seat said valve, a diaphragm exposed to train pipe pressure on one side and to the pressure of said spring on the other side, and means whereby to combine the pressure on the said valve and diaphragm against the force of said spring, to accomplish graduated release of the brakes, substantially as described.

3. A graduated release valve for fluid pressure brakes comprising in combination a valve controlling an outlet from the brake cylinder and exposed to exhaust pressure tending to open it, a movable abutment exposed on one side to pressure from the train pipe, said valve and abutment having predetermined proportionate areas relative to each other and both operating in opposition to a spring, said spring being provided with means for adjusting the tension thereof, subtantially as described.

4. A fluid pressure brake apparatus having a graduated release valve device therein comprising in combination a valve for releasing cylinder pressure, a single diaphragm co-operating with said valve and subject to train pipe pressure, a spring acting in opposition to said diaphragm and valve, and means for regulating the tension of said spring, substantially as described.

In testimony whereof I have hereunder signed my name in the presence of the two subscribed witnesses.

JOHN WELLS CLOUD.

Witnesses:
R. SEEFIELD,
A. A. BERGIN.